April 8, 1969    G. STRAPKO ET AL    3,437,121
EMERGENCY TIRE TRACTION DEVICE
Filed Aug. 21, 1967
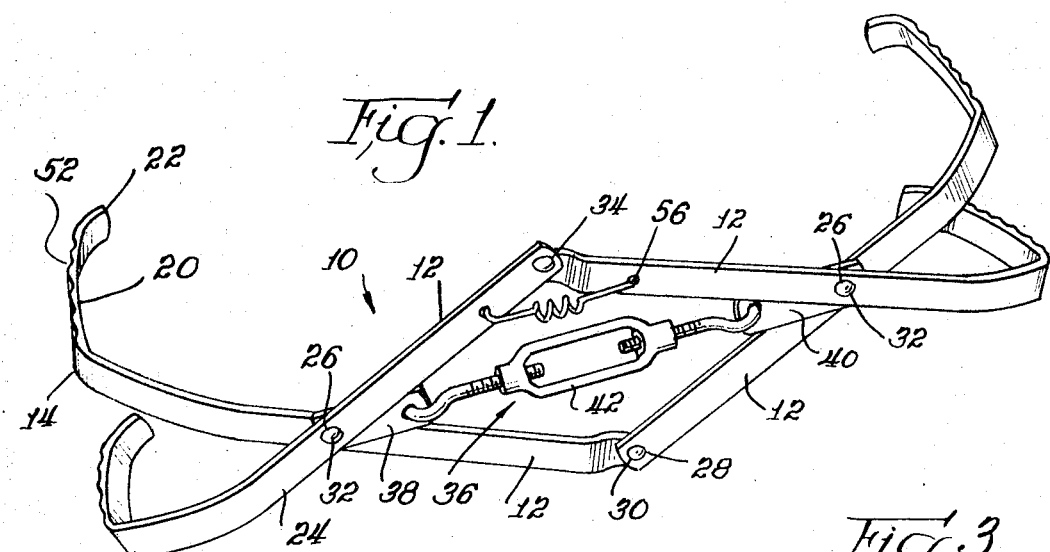
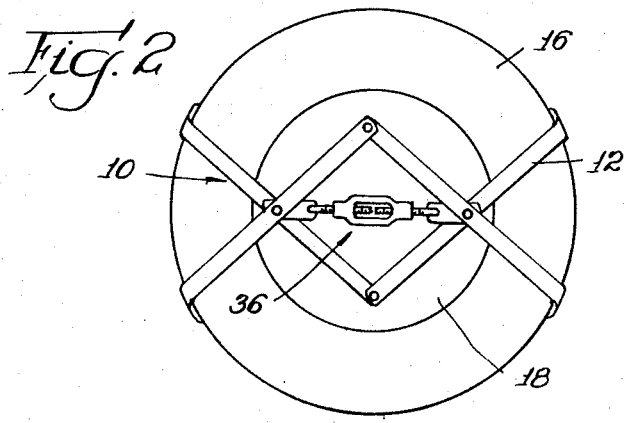
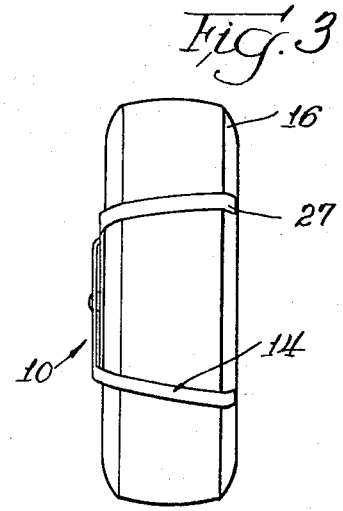
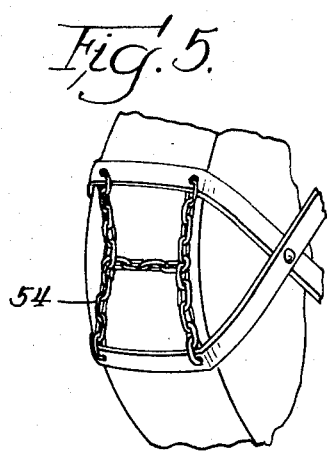
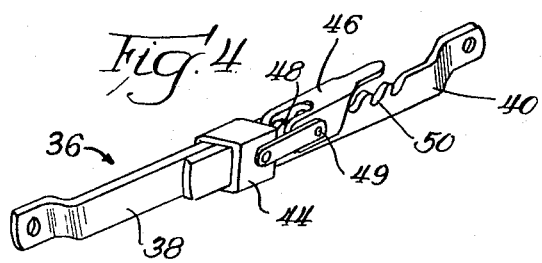
Inventors
Gregory Strapko and
Frank S. Strapko
By
Stephen T. Skrydlak Atty.
Witness: Robert A. Brown

United States Patent Office 3,437,121
Patented Apr. 8, 1969

3,437,121
EMERGENCY TIRE TRACTION DEVICE
Gregory Strapko, 6034 W. Seminole St. 60646, and
Frank S. Strapko, 3137 N. Major Ave. 60634,
both of Chicago, Ill.
Filed Aug. 21, 1967, Ser. No. 662,019
Int. Cl. B60c 27/20, 27/02
U.S. Cl. 152—213          10 Claims

ABSTRACT OF THE DISCLOSURE

To increase traction between a resilient member mounted on a vehicle wheel and a slippery surface of a natural or a man made path of travel, a collapsible device having elongate structural members is placed over and about the resilient member and together with locking means is effective to secure itself to the resilient member. Upon rotation of the wheel when power is supplied thereto, portions of the elongate members are caused to engage the path of travel of the vehicle wheel. In this manner, the wheel is prevented from slipping or spinning on the path of travel and the wheel is effective to react against the path of travel and thereby cause the vehicle to be moved along the surface of earth.

---

This invention relates generally to devices for increasing traction of vehicle wheels and more particularly to an improved traction device especially adapted to be attached quickly and easily over and about resilient members mounted on vehicle wheels employed to receive power from a vehicle and rotate by reaction against the surface of the earth so that the vehicle may be moved thereacross.

The prior art is replete with attempted solutions to the problem of supplying power to a wheel in a manner that prevents slipping whenever the wheel engages a surface that has a low coefficient of friction. The surface may be snow, sleet, mud, rain or any other type of climatic elements that may cause slippage between a resilient wheel and its path of travel.

In general, all of the devices of the prior art attempt to provide arms, links, cables and other like paraphernalia placed on or about a vehicle wheel to increase friction between the wheel and its surface of travel. The present invention can be distinguished from the prior art in that fewer structural members are employed to form an operative device. In addition, a simplified locking means is utilized for quicker and easier attachment of the device to a vehicle wheel and also for more rapid release of the device from a vehicle wheel.

Accordingly, it is an object of the invention to provide an improved traction device of few working parts that may be quickly attached and rapidly released from a resilient member mounted on a vehicle wheel.

Other objects and advantages of this invention will become apparent when reference is made to the following written description considered in conjunction with the accompanying drawings wherein:

FIG. 1 is a perspective view illustrating a traction device having a unique structural arrangement comprising the elements of the present invention.

FIG. 2 shows the traction device mounted over and about a resilient member affixed to a vehicle wheel.

FIG. 3 shows an end elevation of a resilient member and the structural elements of the traction device used for increasing the coefficient of friction with the earth surface or path of travel.

FIG. 4 illustrates an alternate embodiment of the latching means for locking the traction device to the vehicle wheel resilient member.

FIG. 5 illustrates an alternate means mounted between structural elements for increasing friction between resilient member and surface of travel.

Referring now to FIG. 1, the traction device of the present invention is indicated generally by the reference numeral 10. The device 10 is comprised of a plurality of elongate members 12 shown in assembled relationship in FIG. 1.

Each member 12 is fabricated from bar steel or other suitable structural material and has one end 14 formed to conform generally to the peripheral configuration of a resilient member 16 mounted on a vehicle wheel 18 (as shown in FIG. 2). The end 14 of member 12 is substantially U-shaped with a bottom side 20 that is fitted against the exterior surface of the resilient member in direct contact therewith when the device is assembled about the resilient member. A hook portion 22 of the member 12 extends inwardly from an interior end of the bottom side 20 and is adapted to engage an interior side wall of the resilient member. An extended elongate section 24 extends in a direction substantially normal from the outer end of bottom side 20 and terminates at a length that is at least as long and preferably somewhat longer than the radius of the resilient member. Elongate section 24 has a first hole 26 formed therethrough generally intermediate its ends and a second hole 28 formed therethrough near a free end 30 disposed radially inwardly from hole 26.

To assemble traction device 10, two members 12 are secured to each other intermediate their ends by placing through holes 26 a rivet 32, bolt and nut arrangement, or other suitable mechanism sufficient to permit pivotal movement therebetween. Similarly, a second pair of members 12 are secured to each other for pivotal movement therebetween intermediate their ends by placing a rivet 32 through the holes 26 of each member. Each pair of members 12 are joined together so that the U-shaped ends thereof are oriented in the same direction, with hook portions 22 facing inwardly or toward the inner side of the wheel.

The free ends 30 of the first pair of members 12 are pivotally secured to the free ends 30 of the second pair of members by a rivet 34, or the like, so that hook portions 22 of all four U-shaped ends point in a like direction or toward the inner side of the wheel, when the device is placed thereon.

An adjustable locking mechanism 36 extends between the intermediate pivot point 26, 32 of the first pair of members and the intermediate pivot point 26, 32 of the second pair of members. The locking mechanism 36 may comprise a first link 38 pivotally secured by the rivet 32 to the first pair of members at their intermediate pivot point, a second link 40 pivotally secured by rivet 32 to the second pair of members at their intermediate pivot point, and any suitable adjustable means 42 adaptable for selectively reducing the linear distance between the intermediate pivot points of both pairs of members.

One embodiment of the adjustable means 42 is shown in FIG. 1 wherein a turnbuckle arrangement is utilized for decreasing the distance between the intermediate pivot points of each pair of members. Another arrangement for accomplishing the same result is shown in FIG. 4 wherein either link 38 or link 40 is at least longer than one half the distance between the intermediate pivot points when the pivot points are disposed most remotely or separated furthest from each other, as when the members 12 are collapsed to extend longitudinally to form substantially a straight line. It should be noted that end pivot points 30, 34 are closest together when members 12 are in collapsed relationship.

Link 38 (FIG. 4) has a guide means 44 affixed thereto for receiving the free end of link 40. Pivotally secured to the guide means is a latch means 46 having a pin 48 extending laterally between and connecting the side members of latch means 46. A plurality of notches 50 are formed in link 40 to receive pin 48 when the free end of link 40 is inserted in guide means 44. Latch means 46 is rotated backwardly and positioned generally above guide means 44 so that the free end of link 40 may be inserted therein. Pin 48 is placed in a selected one of the notches 50 and latch means 46 is thereafter rotated around the pin 48 and downwardly toward the fixed end of link 40 to thereby cause the intermediate end pivot points of each pair of members to move toward each other and remain fixed in this position so that device 10 is securely affixed to member 16. A spring or other resilient means 56 is utilized to place some tension between the pairs of members 12 to facilitate handling and assembly of the device.

It should be noted that the exterior surfaces of bottom sides 20 may be serrated 52 as shown in FIG. 1 or links of chain 54 may extend therebetween as disclosed in FIG. 5. In addition, any other suitable means may be utilized to provide an increase in earth surface gripping characteristics to improve traction when the device is assembled on a vehicle wheel.

Assembly of the device over and about a vehicle wheel is accomplished by collapsing the members in a manner to cause the pivot points connecting the ends 30 of members 12 to move closer towards each other. The U-shaped ends of the members 12 are thus at their most remote distance from each other. Device 10 is then placed against the resilient member mounted on a vehicle wheel so that the hook portions 22 extend inwardly about the periphery of the resilient member. Locking means 36 is then employed to move the intermediate pivot points toward each other. This movement in turn causes the end pivot points to move away from each other, causing the bottom sides 20 of the U-shaped ends of members 12 to engage and fixedly grip and engage the external peripheral surface of the resilient member. The locking means 36 is adjusted to selectively secure the traction device to the resilient member so that no slipping therebetween occurs when power is transferred to the vehicle wheel and the wheel begins to rotate and move the vehicle in a linear direction by causing the traction device to react against the natural surface of the earth or man made surface on which it is desired to increase traction.

We claim:

1. A wheel traction device having a plurality of wheel gripping members adaptable for peripheral attachment to a resilient member mounted on a wheel comprising a first pair of gripping members pivotally connected approximately intermediate their ends, a second pair of gripping members pivotally connected approximately intermediate their ends, inwardly radially extending ends of said first pair of gripping members pivotally connected to inwardly radially extending ends of said second pair of gripping members, and means for moving said intermediate pivotal connections radially inwardly so that the device is securely affixed to said wheel.

2. A wheel traction device as claimed in claim 1 wherein said gripping members comprise a plurality of U-shaped members each having a bottom side fitted against an exterior surface of said resilient member.

3. A wheel traction device as claimed in claim 1 wherein each of said gripping members comprises a substantially U-shaped end portion, a generally flat bottom side of said U-shaped end portion fitted against an exterior surface of said resilient member, a hook portion formed to project radially inwardly from an inner end of said bottom side, and an elongate section extending radially inwardly from an outer end of said bottom side in a direction substantially normal thereto.

4. A wheel traction device as claimed in claim 3 further comprising resilient means connected between said pairs of gripping members to facilitate handling and assembly of the device over and about the resilient member.

5. A wheel traction device as claimed in claim 1 wherein said moving means comprises an adjustable locking mechanism, said locking mechanism being effective to maintain said intermediate pivotal connections in a static condition.

6. A wheel traction device as claimed in claim 5 wherein said locking mechanism comprises a first link pivotally joined to one of said intermediate pivotal connections, a second link pivotally joined to the other of said intermediate pivotal connections, and a turnbuckle connected between said first and said second links.

7. A wheel traction device as claimed in claim 5 wherein said locking mechanism comprises a first link pivotally joined to one of said intermediate pivotal connections, a second link pivotally joined to the other of said intermediate pivotal connections, said first link having a guide means affixed thereto to receive a free end of said second link, said second link having a plurality of notches formed therein, a latch means rotatably secured to said guide means and having engaging means for reception in a selected one of said notches of said second link, said latch means being effective to fixedly maintain said engaging means received in said selected one of said notches.

8. A wheel traction device as claimed in claim 2 wherein said bottom sides each have serrations formed in an outer surface thereof.

9. A wheel traction device as claimed in claim 2 wherein links of chain are connected between the bottom sides of each pair of said gripping members.

10. A wheel traction device as claimed in claim 1 wherein said moving means is effective to cause the pivotal end connections of said first and second pairs of gripping members to diverge radially outwardly.

References Cited

UNITED STATES PATENTS 1,727,652    9/1929    Leavitt et al.
2,820,501    1/1958    Heuneman.
3,031,000    4/1962    Sebena.

ARTHUR L. LA POINT, *Primary Examiner.*

U.S. Cl. X.R.

152—223, 225